J. M. MEREDITH, Jr.
DETACHABLE GEAR FOR AUTOMOBILES.
APPLICATION FILED DEC. 1, 1919.
1,384,623.
Patented July 12, 1921.
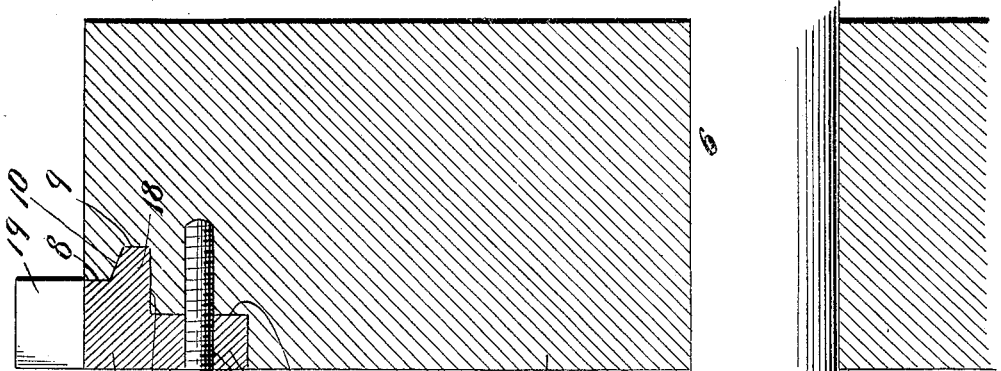
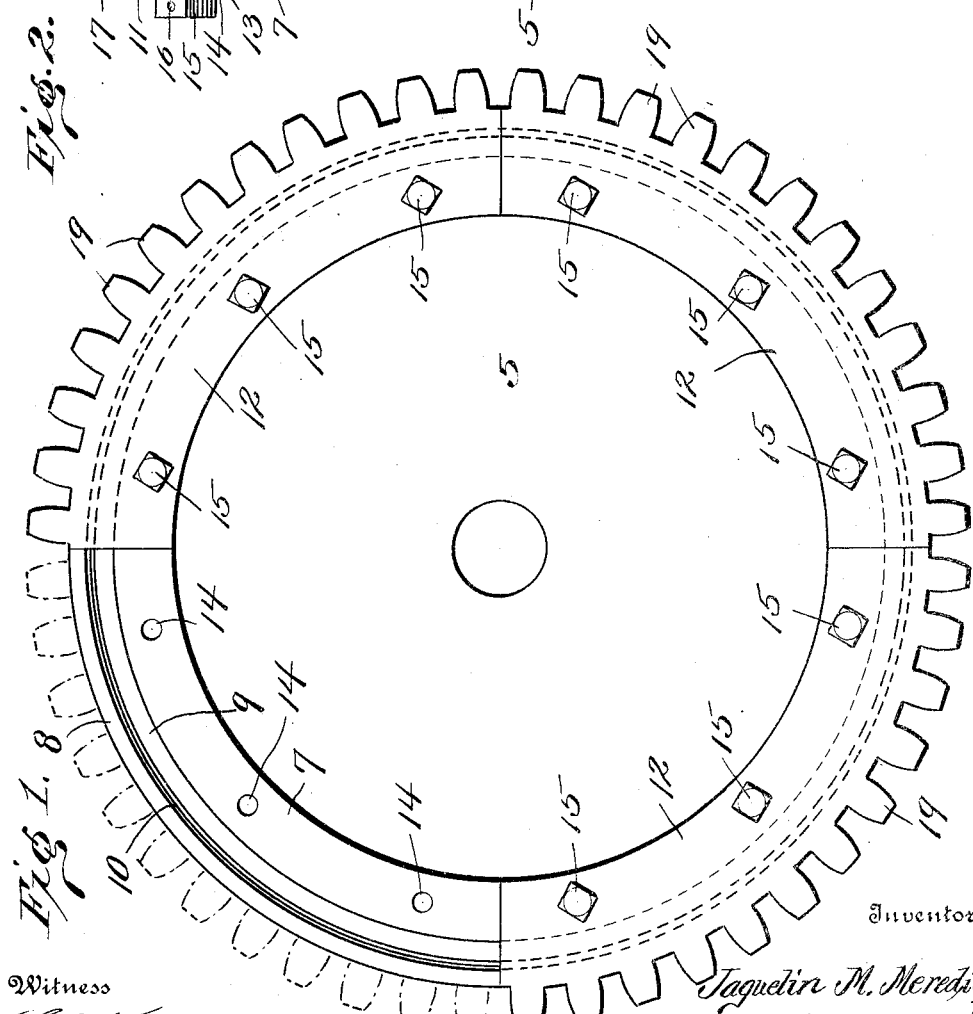

UNITED STATES PATENT OFFICE.

JAQUELIN M. MEREDITH, JR., OF NORFOLK, VIRGINIA.

DETACHABLE GEAR FOR AUTOMOBILES.

1,384,623.  Specification of Letters Patent.  Patented July 12, 1921.

Application filed December 1, 1919. Serial No. 341,598.

*To all whom it may concern:*

Be it known that I, JAQUELIN M. MEREDITH, Jr., a citizen of the United States, residing at Norfolk, in the county of Norfolk and State of Virginia, have invented new and useful Improvements in Detachable Gears for Automobiles, of which the following is a specification.

This invention relates to a detachable gear for general service but particularly adapted for use on fly wheels of automobile engines for operation in connection with starting mechanism, and the primary object of the invention is to provide a gear formed in sections which may be easily applied to a fly wheel or other analogous device, without separating or detaching adjacent parts of mechanism and particularly the parts of an engine or motor, and thereby materially save time in application of gearing and also make it possible to replace any worn section by a similar section without detaching the entire gear with obvious advantages in the cost of repair and up-keep of an automobile.

With these and other objects in view the invention consists in the construction and arrangement of the several parts which will be hereinafter more fully described and claimed.

In the drawing—

Figure 1 is a side elevation of a fly wheel or analogous device showing the improved gear sections applied thereto, one of the sections being removed and illustrating the construction of the fly wheel or other analogous device to receive the gear sections.

Fig. 2 is an enlarged transverse vertical section through a portion of the fly wheel or other device and the gear sections as shown by Fig. 1.

The numeral 3 designates a fly wheel or other device which is adapted to be suitably secured to and operative to rotate a shaft 6, and in the preferred application of the improvements the fly wheel 5 and shaft 6 will constitute the fly wheel and shaft of an automobile motor or engine, the fly wheel being situated adjacent to and adapted to be operated by a starting mechanism. The fly wheel at one side adjacent to the periphery is formed with a groove embodying an inwardly projecting portion 7 which is of less depth than the outer portion 8, the latter having an extension 9 extending into the body of the fly wheel or analogous device and formed with an outer inclined wall 10. The two portions 7 and 8 of this groove also provide a supporting and resisting shoulder 11 which continues inwardly into the body of the fly wheel as a part of the extension 9. This particular groove formation is preferred for the reason that it provides for a flush application of gear members or sections 12 and a positive supporting and reinforcing fit of the said sections with relation to the fly wheel or other device. As shown, four gear sections or members 12 are used in completing the gear attachment to the fly wheel or other device 5. It will be understood, however, that this number of sections may be modified, but it is preferred that the sections be of such number as to permit them to be readily applied and detached without necessitating a disorganization or separation of adjacent mechanical parts. Each gear section or member 12 has an inner reduced securing flange 13 with openings 14 formed therein at intervals to receive headed screw bolts 15, the heads of the bolts tightly bearing against the outer side of the flange 13 and each provided with an opening therethrough, as at 16, for the reception of a suitable bolt locking means. The outer thicker or body part 17 of each section 12 has an inwardly projecting offset or retaining flange 18 which is shaped correspondingly to and snugly fits in the extension 9 to produce a bearing means which rests against the shoulder 11 and also to materially relieve the strain on the screw bolts 14 by obstructing any tendency of the gear sections to shift outwardly or have any displacement whatsoever in view of wear thereof. The retaining flange 18 also obstructs any tendency of its section to fly off in an outward direction during the operation of the fly wheel or analogous device 5. The outer peripheral edge of each section or member 12 is formed with gear teeth 19 which may be of any shape desired and also modified as to their size to adapt them to mesh with or fit into the gears of starting devices.

From the foregoing it will be seen, after the fly wheel or analogous device 5 is grooved as specified, that each section or member 12 may be readily fitted thereto and secured, the ends of the several sections having an abutting association so that the gear sections continue regularly around the fly wheel and dispose the teeth 19 in unbroken sequence. At any time desired or found necessary, any one or more of the sections or members 12 may be removed and replaced by similar sections, thus rendering it possible to expeditiously and cheaply repair the fly or gear wheel.

What is claimed is—

In a device of the class specified, the combination of a rotating member having a stepped groove in the outer portion of one side thereof continuing around the same and opening through the periphery of the member, the inner portion of the groove being reduced in depth to provide a straight shoulder transversely of the member where the said reduced portion of the groove intersects the outer deeper part of the groove, the deeper part of the groove being formed with an inner counter recess which continues the length of the shoulder to provide an increased bearing surface, the outer wall of the recess being beveled outwardly, and separable sections fitted flushly in the grooved portion of the member and having outer parts extending beyond the periphery of the member and portions of equal thickness engaging and snugly fitting the deeper part of the groove, the inner portions of the sections being reduced in thickness to fit in the inner reduced part of the groove, the sections having an inwardly projecting flange of the same contour as and snugly fitting in the counter recess and also bearing upon the said shoulder, and fastening means inserted through the inner reduced portion of each section and groove at a distance inwardly from the flange of the section.

In testimony whereof I have hereunto set my hand in presence of two subscribing witnesses.

JAQUELIN M. MEREDITH, Jr.

Witnesses:
  WALTER SIBERT,
  FLOYD GODFREY.